US008567521B2

(12) United States Patent
Lau

(10) Patent No.: US 8,567,521 B2
(45) Date of Patent: Oct. 29, 2013

(54) POWER TOOL

(75) Inventor: James Ching Sik Lau, Hong Kong (CN)

(73) Assignee: Johnson Electric, S.A., Murten (CH)

( * ) Notice: Subject to any disclaimer, the term of this patent is extended or adjusted under 35 U.S.C. 154(b) by 0 days.

(21) Appl. No.: 12/828,767

(22) Filed: Jul. 1, 2010

(65) Prior Publication Data

US 2011/0000696 A1    Jan. 6, 2011

(30) Foreign Application Priority Data

Jul. 1, 2009    (CN) .......................... 2009 1 0108565

(51) Int. Cl.
*E21B 3/00*    (2006.01)
(52) U.S. Cl.
USPC .......................... 173/213; 173/216; 173/217
(58) Field of Classification Search
USPC ........................................ 173/213, 216, 217
See application file for complete search history.

(56) References Cited

U.S. PATENT DOCUMENTS

| 6,127,751 | A | * | 10/2000 | Kristen et al. | ................. | 310/50 |
| 6,320,286 | B1 | * | 11/2001 | Ramarathnam | ................. | 310/50 |
| 6,902,012 | B2 | * | 6/2005 | Kristen et al. | ................. | 173/200 |
| 6,966,391 | B2 | | 11/2005 | Tang | | |
| 7,064,462 | B2 | * | 6/2006 | Hempe et al. | ................. | 310/50 |
| 7,156,191 | B2 | | 1/2007 | Lau | | |
| 7,252,157 | B2 | * | 8/2007 | Aoki | ......................... | 173/162.2 |
| 7,330,006 | B2 | * | 2/2008 | Iwata et al. | ............. | 318/400.41 |
| 2003/0222516 | A1 | * | 12/2003 | Cleanthous et al. | ............ | 310/50 |
| 2004/0124721 | A1 | * | 7/2004 | Pfisterer et al. | ................. | 310/51 |

FOREIGN PATENT DOCUMENTS

CN    1361937    7/2002

* cited by examiner

*Primary Examiner* — Alexandra Elve
*Assistant Examiner* — Eyamindae Jallow
(74) *Attorney, Agent, or Firm* — Muncy, Geissler, Olds & Lowe, PLLC

(57) ABSTRACT

A power tool includes a case; a motor installed within the case, the motor comprising a motor housing and a rotor with shaft; a gear train comprising a gear train housing and a speed reduction mechanism installed within the gear train housing and connected to the shaft of the motor. The motor housing and the gear train housing are integrally formed as a common housing and fixed relative to the case.

9 Claims, 3 Drawing Sheets

POWER TOOL

CROSS REFERENCE TO RELATED APPLICATIONS

This non-provisional patent application claims priority under 35 U.S.C. §119(a) from Patent Application No. 200910108565.0 filed in The People's Republic of China on Jul. 1, 2009.

FIELD OF THE INVENTION

This invention relates to power tools such as portable drills and electric screw drivers and in particular, to a motor/gear train assembly for a power tool.

BACKGROUND OF THE INVENTION

A traditional power tool comprises a gear train driven by a separate motor, the gear train and motor being installed in a case of the power tool independently. Alternatively, the motor and gear train may be connected together before being fitted to the case. In either assembly method, eccentricity inevitably exists between the gear train and the motor.

Eccentricity between the gear train and the motor means that the alignment between the motor shaft and the gear train is not correctly aligned increasing the friction of the connection resulting in higher friction and greater heat generation. This higher friction means that the power tool has a lower efficiency and will use more power to do the same task. This is undesirable, especially if the power tool is powered by batteries.

SUMMARY OF THE INVENTION

Hence there is a desire for a power tool in which eccentricity between the gear train and the motor is minimized or eliminated.

This is achieved in the present invention by using a common housing to accommodate both the motor and the gear train.

Accordingly, in one aspect thereof, the present invention provides a power tool comprising: a case; a motor installed within the case, the motor comprising a motor housing and a rotor including a motor shaft; a gear train comprising a gear train housing and a speed reduction mechanism installed within the gear train housing and connected to the motor shaft; wherein the motor housing and the gear train housing are integrally formed as a common housing and fixed relative to the case.

Preferably, a pair of power leads extend through an opening in the motor housing adjacent the gear train and arranged to provide power to the motor.

Preferably, the motor comprises a brush card supporting brushes thereon for slidingly contacting a commutator of the motor, each power lead comprising first and second ends, the first ends being connected to a corresponding brush and the second ends being connected to a switch of the power tool.

Preferably, a fan is fixed to the rotor, the brush card being located between the gear train and the fan.

Preferably, the fan is disposed within the motor housing and aligned with at least one opening in the motor housing to blow air out of the motor housing.

Preferably, the motor is a brush motor, permanent magnets being installed on an inner surface of the motor housing.

Preferably, the motor is a brushless motor, the motor comprises a circuit board with control circuits for the motor mounted thereon, each power lead comprises first and second ends, the first ends being connected to the control circuit and the second ends being connected to a switch of the power tool.

Preferably, a fan is fixed to the rotor, the circuit board being located between the gear train and the fan.

Preferably, the fan is disposed within the motor housing and aligned with at least one opening in the motor housing to blow air out of the motor housing.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
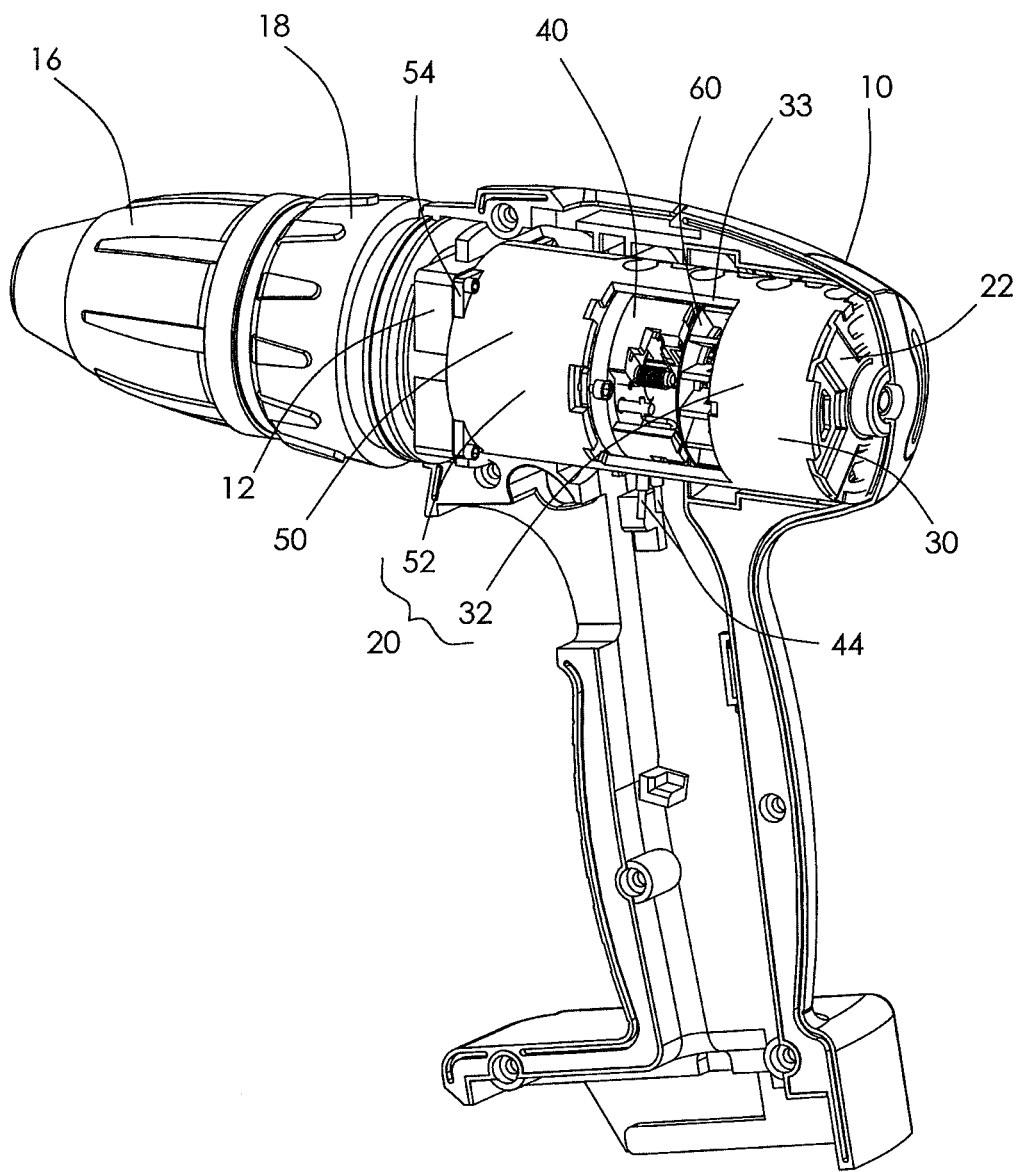
FIG. 1 illustrates a power tool according to the preferred embodiment of the present invention, with a part of a case and a switch of the power tool removed.
Figure 2:
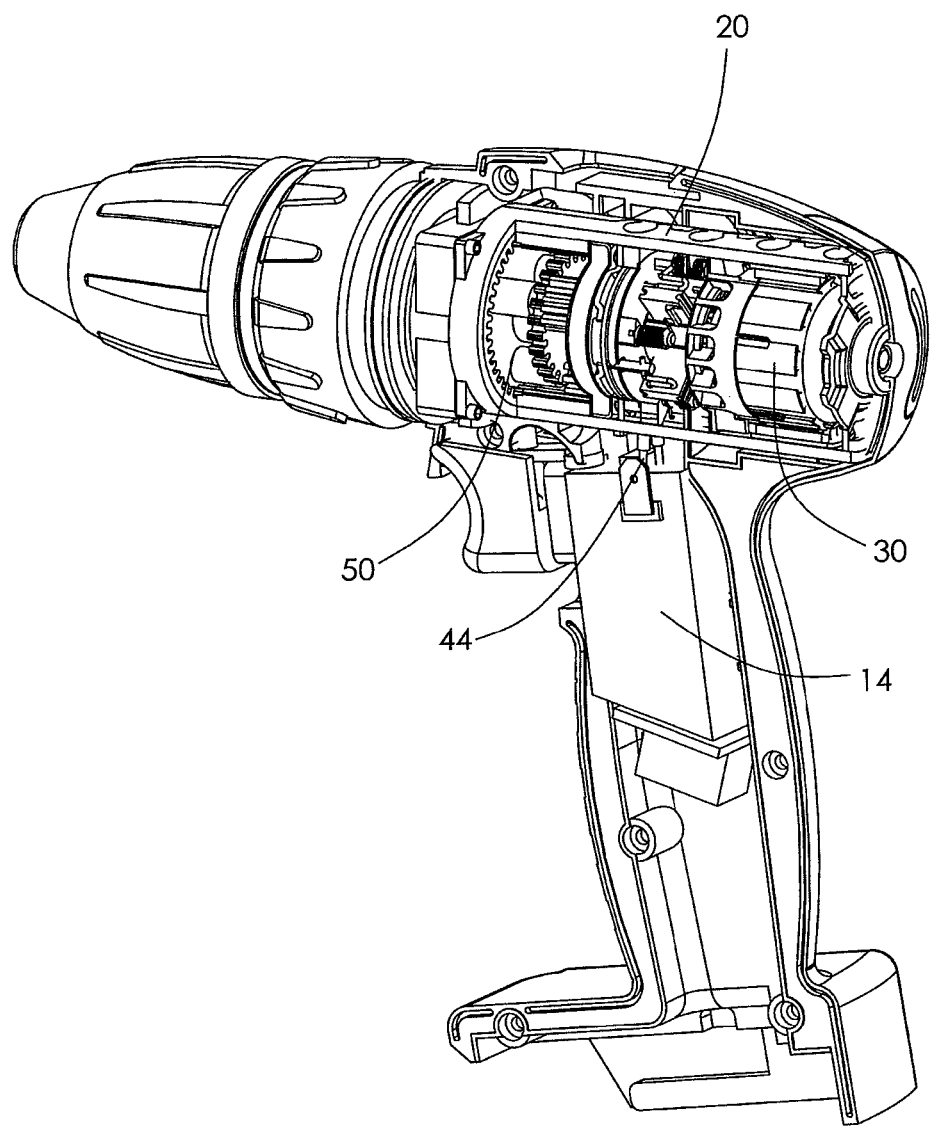
FIG. 2 is a view similar to FIG. 1, with the switch mounted in the case and a part of a housing of the gear train and motor cutaway.
Figure 3:
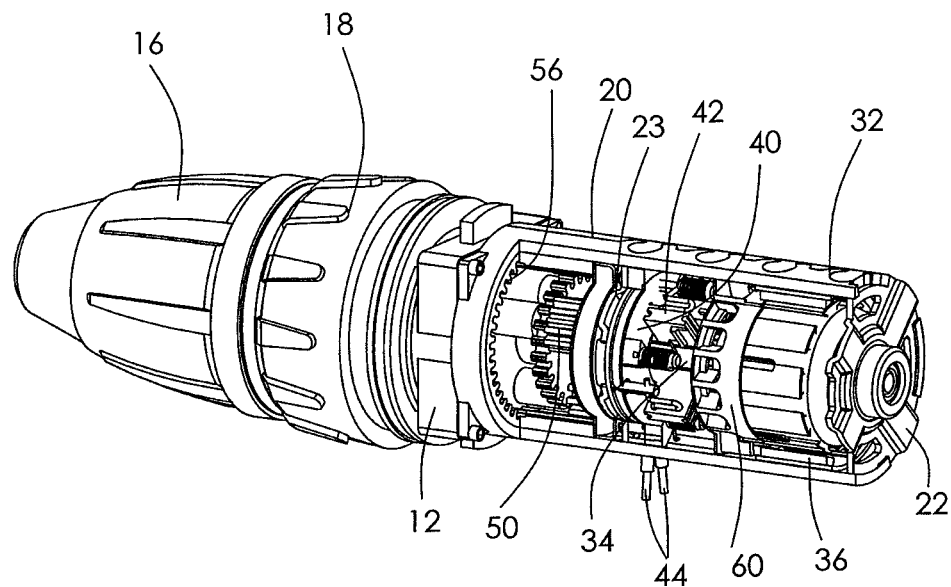
FIG. 3 is a view similar to FIG. 1, but with the entire case and switch removed and the housing partially cutaway.

FIGS. 1 to 3 show a power tool according to the preferred embodiment of the present invention with various parts removed or cut away to show the construction. The power tool comprises a case 10, a motor 30 and a gear train 50 installed in the case 10. A chuck 16 and a torque reduction mechanism 18 are also shown. The motor 30 comprises a motor housing 32 forming a part of a stator of the motor and a rotor including a shaft. The gear train 50 comprises a gear train housing 52 accommodating gears driven by the motor. The motor housing 32 and the gear train housing 52 are integrally formed as a single structure, herein after referred to as the housing or common housing 20. In this embodiment, the housing 20 has a cylindrical or tubular shape. The gear train housing 52 has a mounting base 54 which is attached to a frame 12 which is fixed to the case 10.

Figure 4:
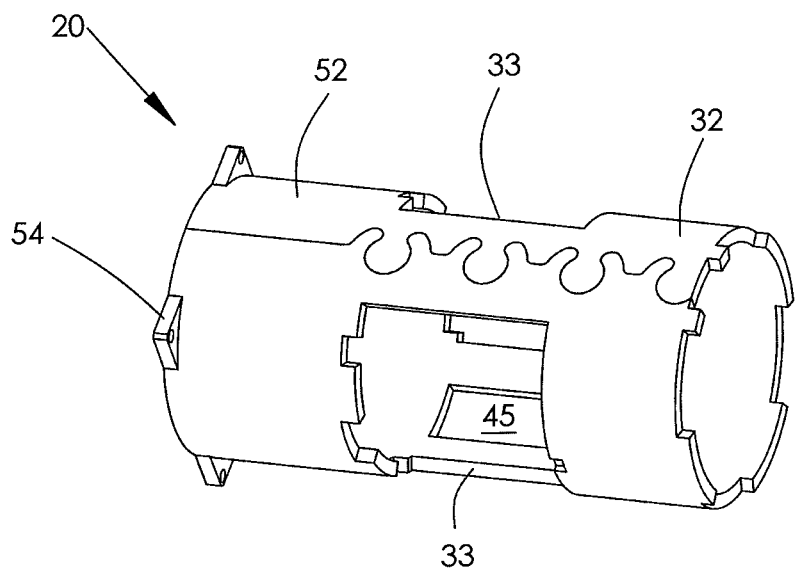
FIG. 4 is a view of the housing.

In FIG. 3 the housing 20 is partially sectioned to show the motor and gear train assembly. In this embodiment, the motor 30 is a brush motor and comprises a brush card 40 on which brushes 42 are mounted. The brushes 42 slidably contact with a commutator 34 being a part of the rotor of the motor 30. Permanent magnets 36 are attached to the inner surface of the housing 32. A pair of power leads 44 connected to the brushes 42 extends through a hole 45 (FIG. 4) in the motor housing 32 to connect to the switch 14 (FIG. 2) of the power tool.

A fan 60 is mounted to the rotor of the motor 30 and located within the motor housing 32. The brush card 40 is located between the gear train 50 and the fan 60. The motor housing 32 defines a pair of openings 33 at opposite sides of a portion adjacent to the gear train 50. The openings 33 expose the brushes 42, commutator 34 and the fan 60. Airflow generated by the fan 60 flows through the opening 33 to an air passage formed within the case 10.

The gear train 50 comprises a speed reduction mechanism installed within the gear train housing 52 and driven by the shaft of the motor 30. The gear train is optionally of a planetary gear type.

Alternatively, the motor 30 may be a brushless motor. The brush card 40 may be a circuit board with control circuits mounted thereon. The power leads 44 are connected to the circuit board 40 and switch 14 for supplying power to the circuit board 40.

In the present invention, the motor housing 32 and the gear train housing 52 are integrally formed, which avoids concentricity errors which exist when assembling two separate housings independently. Furthermore, with the brush card/circuit board 40 being located between the motor 30 and gear train 50, the power leads 44 extend from the brush card/circuit board 40 and connect to the switch 14 after passing through the hole 45 in the case 10. Compared to traditional power tools where the brush card/circuit board 40 is located at the end of the motor remote from the gearbox, the power leads 44 of the present invention are relatively short as the switch 14 is located close to the brush card/circuit board 40. This means that the resistance of the power leads is reduced giving more power to the motor and reducing the heat produced by the power leads. This is particularly desirable for battery operated power tools.

While the common housing 20 may be of a plastics material, it is preferred if the housing is made from one piece of sheet steel which is rolled and joined at the lateral edges to form a hollow tube. End plates or bearing brackets 22, 23, are fixed to the housing 20 to support the rotor via bearings. The outer bearing bracket 22 closes the motor end of the common housing and has vents for the passage of air drawn in by the fan 60 to cool the motor. The outer bearing bracket 22 is fixed to the housing 20 by crimps. The brush card is fixed to the inner bearing bracket 23 which is fixed to the housing 20 by crimping tabs into recesses in the edges of the openings 33. A ring gear 56 of the gear train is pressed into or otherwise fixed to and closes the gear train end of the common housing 20.

Optionally, the housing 20 could be formed by two sheets of electrical steel rolled into half tubes and joined together along the lateral edges to form the common housing in a clam shell arrangement. This simplifies assembly of the parts into the housing and allows crimping to be avoided by fitting tabs of the bearing brackets into slots in the housing. Tabs and slots could also be used to fix the ring gear 56 to the housing 20.

An oil seal is provided between the inner bearing bracket 23 and the gears to prevent oil or grease from the gear train contaminating the motor, especially the brush card and commutator.

In the description and claims of the present application, each of the verbs "comprise", "include", "contain" and "have", and variations thereof, are used in an inclusive sense, to specify the presence of the stated item but not to exclude the presence of additional items.

Although the invention has been described with reference to one or more preferred embodiments, it should be appreciated by those skilled in the art that various modifications are possible. Therefore, the scope of the invention is to be determined by reference to the claims that follow.

The invention claimed is:

1. A power tool comprising:
    a case;
    a motor installed within the case, the motor comprising a motor housing and a rotor including a motor shaft;
    a gear train comprising a gear train housing and a speed reduction mechanism installed within the gear train housing and connected to the motor shaft; and
    a switch installed within the case;
    wherein the motor housing and the gear train housing are integrally formed as a common housing having a single piece monolithic construction and fixed relative to the case, the motor comprising a first axial end adjacent to the gear train and a second axial end remote from the first end and the gear train, the first axial end located axially between the gear train and the second axial end, the motor housing defining a radial opening at a portion adjacent to the gear train and away from the second axial end of the motor, the radial opening being adjacent to the switch, which is closer to the first axial end of the motor than to the second axial end of the motor;
    wherein the motor further comprises one of a brush card and a circuit board installed within the common housing at the first axial end and adjacent to the switch; and
    wherein a pair of power leads extend through the radial opening and is connected to the switch and the one of a brush card and a circuit board for providing power to the motor.

2. The power tool of claim 1, wherein the motor comprises the brush card supporting brushes thereon for slidingly contacting a commutator of the motor, each power lead comprising first and second ends, the first ends being connected to a corresponding brush and the second ends being connected to the switch of the power tool.

3. The power tool of claim 2, wherein a fan is fixed to the rotor at the first axial end of the motor adjacent to the gear train, the brush card being located between the gear train and the fan in an axial direction of the common housing.

4. The power tool of claim 3, wherein the fan is disposed within the motor housing and radially aligned with at least one radial opening in the motor housing to radially blow air out of the motor housing.

5. The power tool of claim 1, wherein the motor is a brush motor, permanent magnets being installed on an inner surface of the motor housing.

6. The power tool of claim 1, wherein the motor is a brushless motor, the motor comprises the circuit board with control circuits for the motor mounted thereon, each power lead comprises first and second ends, the first ends being connected to the control circuit and the second ends being connected to the switch of the power tool.

7. The power tool of claim 6, wherein a fan is fixed to the rotor at the first axial end of the motor adjacent to the gear train, the circuit board being located in the motor housing between the gear train and the fan.

8. The power tool of claim 7, wherein the fan is disposed within the motor housing and aligned with at least one opening in the motor housing to radially blow air out of the motor housing via the at least one opening.

9. The power tool of claim 1, wherein inner and outer bearing brackets are fixed to the common housing to support the rotor via bearings, a fan being axially located between the inner and outer bearing brackets, the outer bearing bracket closing the motor end of the common housing and having vents for passage of air drawn in by the fan to cool the motor.

* * * * *